United States Patent Office 2,805,962
Patented Sept. 10, 1957

2,805,962

IMPREGNATION OF SHEET MATERIALS WITH SYNTHETIC RESIN LATICES

Charles Emil Hendricks, Clifton, N. J., assignor to The Celastic Corporation, Arlington, N. J., a corporation of Delaware No Drawing. Application July 22, 1954, Serial No. 445,184

2 Claims. (Cl. 117—120)

This invention relates to a method of stiffening a fibrous sheet material, and more particularly it relates to a method of preparing shoe stiffeners by treating a sheet material with a synthetic resin latex.

High quality shoe stiffeners in the past have been made by impregnating a flannel sheet material with finely divided particles of cellulose nitrate. After drying this product was stored until ready for use, at which time the impregnated flannel was dipped into a solvent for the cellulose nitrate, applied to the appropriate shoe part and allowed to dry in a stiffened condition.

It is also known that sheet materials such as flannel may be impregnated by dipping the flannel into an aqueous dispersion of synthetic resin, such as a synthetic rubber latex. However in all the known processes there are operating difficulties which arise because of the tendency of such a latex to deposit in the form of a dense impervious layer. As a result of forming such a layer the porosity of the impregnated material is low and the ability of the material to absorb solvents is poor. The low porosity and poor solvent absorption prevents the achievement of the greatest stiffness for a given composition of impregnated fabric. Therefore to obtain a desired stiffness, according to known processes, heavier flannels or other supporting materials, must be impregnated with a greater amount of resin, and such procedures are commercially unattractive.

In United States Patent 2,760,884, issued August 28, 1956, there is disclosed and claimed a process whereby certain relatively cheap synthetic resin latices may be impregnated in the form of finely divided particles into a flannel sheet material, which has a long storage life, and which may thereafter be treated with a solvent for the synthetic resin, applied to the shoe part, and allowed to dry and form a high quality shoe stiffener. The sheet material utilized in the process of this copending application may be of the lightest grade and yet be impregnated with sufficient resin to be stiffened to a very high degree, because the process produces a highly porous impregnated fabric having the ability to absorb larger percentages of solvent than has ever been achieved by the use of synthetic resin latex impregnation. This process, in general, involves dipping a sheet material into an aqueous bath containing a synthetic resin latex, a latex coagulant, and a dispersing agent which is water-soluble at room temperature and insoluble at some higher temperature, about 40° to 100° C. The impregnated sheet, is heated to 40° C. to 100° C., causing the dispersing agent to become insoluble and thus allowing coagulation to take place. The impregnated sheet material prepared in this manner contains uniformly dispersed agglomerates of synthetic resin particles and the sheet material is dry, flexible and easy to handle or to store.

The present invention is an alternate procedure to that described and claimed in United States Patent 2,760,884. The present invention provides a two-step process for impregnating a fibrous sheet material with a synthetic resin latex and a coagulant for the latex to produce a sheet material capable of being stiffened by treatment with a solvent for the resin. In the present process the sheet material is impregnated with a resin latex in one step and treated with coagulant in a separate step. The order of treatment is immaterial, and therefore the sheet material may be impregnated with latex either before or after the sheet material is contacted with the latex coagulant. The latex particles are agglomerated immediately upon contact with the coagulant in the present process, while in the process of the copending application agglomeration does not occur until the impregnated material is heated.

It is an object of this invention to provide a novel method for stiffening fibrous materials. It is another object of this invention to prepare high quality shoe stiffeners by using a synthetic resin latex as the impregnating medium. It is still another object to provide a two-step process for impregnating fibrous sheet materials which are capable of being stiffened by subsequent solvent treatment. Other objects will become apparent from the more detailed explanation of this invention.

The above objects are accomplished in accordance with the process of this invention by impregnating a fibrous sheet material with an aqueous latex of a synthetic vinyl resin. The sheet material may be treated prior to the above latex impregnation step with a polyvalent metal salt coagulant, or the sheet material may be treated with a solution of such a coagulant by a step subsequent to the latex impregnation step. The aqueous resin latex comprises from about 20% to about 60% by weight of vinyl resin particles and at least about 0.10% and preferably not more than about 3.0% by weight of an anionic surface-active wetting agent. This amount of wetting agent is equivalent to 0.5% to 5.0% by weight of the resin solids present.

In a step separate from the above latex impregnation the fibrous sheet material is contacted with a polyvalent metal salt, normally in the form of a 5% aqueous solution. Whether the coagulant is applied prior to or subsequent to the latex impregnation, the resin solids agglomerate immediately upon contact between the coagulant and the resin particles. The agglomeration takes place in the interstices of the impregnated material forming resin agglomerates in situ. After the sheet material has been impregnated with the latex and the coagulant, it is dried, for example, in an air oven at about 100° C., to form a flexible composition, and may at any time thereafter be treated with a solvent for the resin causing the dry flexible material to become stiffened.

There are several embodiments of this invention, all of which produce the same dry, flexible impregnated sheet material. In one method, the fibrous sheet material is first impregnated with the above-described resin latex, stripped to remove excess liquid, and then impregnated with an aqueous coagulant solution, followed by drying. In a second procedure, the fibrous sheet material is first impregnated with an aqueous coagulant solution and, at least partially, dried, and then impregnated with the resin latex, stripped and dried. In still a third embodiment, a creamed latex is prepared by adding to the above-described resin latex enough coagulant salt to cause the watery latex to coagulate partially and to have a creamy consistency. The fibrous sheet material is first impregnated with this creamed latex, stripped, and then impregnated with a dilute coagulant solution and dried. Each of the above methods produces a dry, flexible, sheet material impregnated with resin agglomerates, and this material, after drying, may be stored for long periods of time without suffering harm due to chemical or physical change. This material is capable of being stiffened by treatment with a volatile solvent for the resin. Upon evaporation of the solvent, the sheet material stiffens.

In the preferred embodiment of this invention an impregnating medium is prepared by mixing at room temperature, 3 parts by weight of an aqueous polystyrene latex containing about 50% solids, 1 part of an aqueous latex of a copolymer of styrene and butadiene (in the approximate proportion of 80 parts styrene to 20 parts butadiene) containing about 45% solids, and about 1% by weight of resin solids of an anionic surface-active organic phosphate or sulfonate as a wetting agent. The desired sheet material is then dipped into this latex and stripped of excess liquid by passing between closely spaced rolls. The sheet material is then dipped into a second bath containing aluminum sulfate, in the form of a 1% aqueous solution. Agglomeration of the resin solids takes place within the sheet material at this time. The material is then dried in air at about 100° C. and there is recovered a dry, flexible, impregnated sheet material containing 60% to 70% or more resin solids in the form of small agglomerates dispersed throughout the sheet material. Because of these agglomerates the sheet material is highly porous and is capable of absorbing a large amount of resin solvent which in turn is the principal factor permitting the achievement of a high degree of stiffness in the impregnated sheet material.

When this impregnated material is ready for use as a stiffener, it is blanked into the desired shape, treated with a volatile solvent for the resin, such as methyl ethyl ketone, toluene, mixtures of these materials with diluents, or other known solvents, applied to the base which is to be stiffened, and the solvent is allowed to evaporate, thus producing a stiffened sheet material.

The following examples are given to illustrate various embodiments of this invention. Parts and percentages are by weight unless otherwise specified.

*Example 1.*—An impregnating medium was prepared by blending 3 parts of an aqueous latex containing 50% solids in the form of polystyrene and 1 part of an aqueous latex containing 45% solids in the form of an 80/20 copolymer of styrene/butadiene. To this latex blend there was added 0.5% by weight of resin solids of an organic phosphate surface-active agent salt under the name "Victor Stabilizer" sold by the Victor Chemical Works (Chicago, Ill.). A piece of cotton flannel weighing 0.36 pounds per square yard was dipped into a 1% aqueous solution of aluminum sulfate, stripped of excess liquid by passing the wet fabric between rolls spaced .033" apart, and thereafter the fabric was dried at 100° C. in an air oven. The dried fabric was then dipped into the above described latex blend and passed between stripping rolls spaced .033" apart. The impregnated fabric was placed horizontally in an air oven maintained at 100° C. and dried in that position. The amount of resin solids in the dried impregnated fabric amounted to 69% of the total weight of the impregnated fabric. A portion of this impregnated fabric was tested to determine its ability to absorb a solvent for the resin. The solvent utilized was a mixture of 90% by weight of toluene and 10% by weight of a commercial petroleum naphtha fraction boiling in the range of 100 to 167° C. The material was sufficiently absorbent that 71.7% of the dry weight of the fabric was solvent. Upon evaporation of the solvent material the fabric is a stiff, boardy, material which is very tough and flexes with difficulty.

Any of several kinds of synthetic resins having electrostatic properties may be used as the major ingredient in the impregnating latex, although the vinyl resins are preferred, such as polystyrene, polymethylstyrene, polyvinyl halides, polyvinylidene halides, polyacrylates, polyacrylonitrile, and polyalkylacrylates. Copolymers of styrene/butadiene, high in styrene content and low in butadiene content are also operable. It is desirable in many instances to employ a plasticized resin, such as a mixture of polystyrene and a copolymer of high styrene content and low butadiene content, the copolymer acting as a plasticizer and thereby causing the polystyrene to be less brittle although retaining its stiffness. Other known plasticizers such as organic esters, and other non-volatile, non-hardening liquids may be incorporated with the base resin to reduce brittleness in the same manner as the styrene/butadiene copolymer is used above. Polymers of styrene or of vinyl halides are particularly desirable because of their availability and low cost.

Many varieties of resins and combinations of polymers have been found to be useful in this process. One useful group of resins is a copolymer of styrene/butadiene containing 4% to 20% by weight of butadiene. A preferred formulation is a mixture of 3 parts polystyrene with 1 part of an 80/20 copolymer of styrene/butadiene, which mixture has a total composition of 95% styrene and 5% butadiene. The proportions of polystyrene and the styrene/butadiene copolymer can be varied within the general range of 4–20% by weight of butadiene in the total mixture to produce slightly stiffer and harder compositions as the butadiene proportion is reduced and soften more elastic compositions as the butadiene proportion is increased. The same variety of compositions can be obtained by mixing well known plasticizers with polystyrene or other hard plastic materials, particularly the vinyl polymers such as vinyl halide, vinylidene halide, alkyl acrylates, and other resins known to those skilled in the art.

The latex used as a starting material in the preparation of the impregnating bath of this invention is a colloidal dispersion of one or more of the above resins in an aqueous medium. Preferably, the dispersion contains from about 40% to about 60% resin solids, while the remainder is essentially all water. These dispersions or latices are available commercially on the open market in concentrations of 40% to 60% solids, or they may be prepared by known methods, such as dispersion polymerization. The latex of resin and water constitutes the largest portion of the impregnating mixture of this invention and the additives described below constitute less than about 15% of the total weight of the impregnating mixture, although there are some embodiments of this invention wherein a large amount of filler is employed. After all additives are incorporated into the latex, it may then be diluted if desired, and in any case will contain about 20% to 60% resin solids in the final form as an impregnating bath.

Anionic surface-active wetting agents are required additives to the latex utilized in this invention. The wetting agent is required to cause the fabric to be easily wetted by the latex and thus permit the interstices of the supporting fibrous material to fill quickly and completely with the impregnating latex. The more commonly known of such compounds are the alkali metal organic sulfates, sulfonates, phosphonates, and phosphates, in which the organic group is a long chain alkyl or alkyl aryl group. Included among these compounds is isopropyl napthalene sodium sulfonate, the dioctyl ester of sodium sulfosuccinic acid, sodium alkyl sulfates, sodium alkyl phosphates, sodium alkyl phosphonates, the sodium salt of 2-ethylhexyl polyphosphate, ammonium soaps, and other commonly known anionic detergents. Many other anionic surface-active agents will be apparent to those skilled in the art.

The preferred amount of the surface-active wetting agent may vary from about 0.5% to about 5% by weight of the resin solids present. When the solids content of the latex is 20% to 60% the amount of the surface-active wetting agent becomes 0.1% to 3.0% by weight of the total latex. Larger amounts than 3% are not harmful to the process and the limit of 3% is selected for economic reasons entirely. Less than about 0.10% of wetting agent reduces the speed with which the sheet material may be impregnated and thereby the efficiency of the process, if time is a factor in the process.

Coagulants which may be employed in the process of this invention are the water-soluble polyvalent metal salts such as chlorides, nitrates, sulfates, acetates, etc. of aluminum, magnesium, calcium iron, tin, copper, cobalt, chromium, cadmium, strontium, etc. Of these various salts calcium chloride, ferric sulfate, magnesium sulfate, and aluminum sulfate are desirable, although the latter two are preferred because of their lower costs, better solubility characteristics, and the fact that they do not impart undesirable color to the finished product. The alums such as the potassium, sodium, or ammonium aluminum sulfates are as desirable as aluminum sulfate as the coagulant in this process.

The amount of coagulant required will vary slightly with the chemical nature of the coagulant salt, the type and amount of resin employed, and other reaction conditions. For the preferred coagulant, aluminum sulfate, used with a latex of styrene/butadiene resin approximately 0.5% by weight of the resin solids present in the latex is sufficient to accomplish the desired result. When used with other resin formulations, the amount of aluminum sulfate may vary from about 0.5% to about 3.0% by weight of the resin solids. For other coagulants, some of which are known to be less active and less efficient than aluminum sulfate, the amount employed may be as high as 10% or 15% by weight of the resin solids.

In one embodiment of this invention, the resin latex is creamed by partially coagulating the latex solids, and the resulting creamed latex is utilized as the impregnating medium. Creaming of a resinous latex or a rubbery latex is accomplished by the well known and simple procedure of adding small quantities of a coagulant to the latex while the latex is being agitated. As more and more coagulant is added the latex becomes creamy in appearance and in consistency, due to the formation of small agglomerates from the original latex containing colloidal particles. The addition of more coagulant will cause the formation of large lumps of resin which separate easily from the aqueous medium. The formation of a creamy consistency is the desired result according to this invention, and the further coagulation into large lumps is to be avoided. Visual observation may be employed to control the amount of coagulant required to reach a creamy consistency in the latex. In general the amount of coagulant required is about 0.25% by weight of the resin solids in the latex.

As a final step in the preparation of the impregnating latex, water may be added to form the desired concentration of resin solids, which for most embodiments of this invention will be from about 20% to about 60% by weight of solids. For the preparation of shoe stiffeners, a concentration of about 40% solids has been found to be preferable.

The material which is to be stiffened may, in general, be any fibrous sheet material such as fabric, textiles, felted materials, mats, paper, or the like. The sheet material may be made of natural or synthetic fibers or a mixture of the two. In the case of shoe stiffeners the material commonly employed is a cotton flannel, although non-woven sheet material or even paper may be used in some cases.

Filler materials may be in corporated into the impregnating medium of this invention to serve several useful purposes. For example, the filler may be used to reduce the cost of the materials used in the impregnating bath. The use of a filler in many instances causes the impregnated material to be more porous and therefore to be able to absorb more solvent and achieve a greater stiffness. In some cases, the use of a filler enhances the adhesiveness of the impregnated material to an adjacent laminating layer. In the manufacture of shoe parts using the impregnated shoe stiffener of this invention it has been found that the incorporation of filler material permits the shoe stiffener to be handled easily when it is wet with solvent and ready to be incorporated into the shoe part and, furthermore, after the shoe part has been assembled there is less likelihood that resin solids will migrate from the shoe stiffener and cause visible spotting on the leather surfaces of the shoes. Filler materials which may be used include water-insoluble fillers such as siliceous materials, infusorial earths, bentonite clays, dicalite, and other inert materials known to those skilled in the art. The amount of filler material which may be used may be as much as about 100% by weight of the resin solids present and a range of values of about 20% to 50% is preferable for most embodiments of this invention.

Thickeners have utility in this invention when it is desired to impregnate a fabric with greater and greater amounts of resin solids, and when fillers and other ingredients of the latex have a tendency to settle out. Thickeners which have been used successfully include methyl cellulose and methyl carboxy cellulose. Other equally useful thickeners are well known to those skilled in the art.

In the process of preparing a stiffened material such as a shoe stiffener, cotton flannel or other supporting sheet material is dipped, sprayed, covered, or otherwise treated with the impregnating latex, which is prepared according to the above description.

The excess liquid is removed from the wet impregnated material by a suitable means such as coacting stripping rolls, a wiper knife, or the like. Such an operation is capable of loading the supporting material to the desired amount of about 50% or more by weight of impregnating solids if the original impregnating latex contains about 40% solids. The stripped impregnated material is then contacted with an aqueous solution of a coagulant salt such as aluminum sulfate or alum and finally dried at 100° C. or greater to evaporate the remaining water from the impregnated material. In the previous description it has already been shown that the fabric may be treated with the coagulant prior to the step of impregnating with the latex or the fabric may be treated with coagulant subsequent to the latex impregnation and it is not intended that this invention be limited to any particular order of procedure so long as there are two steps involved in this process; namely, (1) an impregnation of the fabric with a resin latex and (2) an impregnation of the fabric with an aqueous solution of a coagulant salt.

After the second impregnation step in any of the above process alternatives, the impregnated material contains small agglomerates of resin particles uniformly dispersed throughout the sheet material. After drying to remove the remaining water, this material may be stored if desired, or it may be used in the production of a stiffened article of manufacture, such as a box toe or counter in a shoe, a laminate with other materials, shaped molds, and other similar objects. The stiffening process is accomplished by treating the dry, impregnated material with a solvent for the resin, forming the solvent-treated material into the desired shape and allowing the solvent to evaporate leaving a stiff, self-supporting, article. The solvent for the polystyrene resin may be methyl ethyl ketone, toluene, or mixtures of these materials, and the solvent for the polyvinyl chloride resin may be methyl ethyl ketone, cyclohexanone, or mixtures of these materials with each other or with diluents. Other solvents for these and other operable resins are known to those skilled in the art.

The process of this invention is particularly useful in the preparation of shoe stiffening materials such as box toe or shoe counters and it also finds a wide variety of uses in the preparation of impregnated materials which are used to stiffen or otherwise strengthen material with which it is laminated. The impregnated material of this invention may be used to repair sheet metal articles such as roof gutters, downspouts, fenders and bodies of automobiles. This material also finds use in covering the decks and hulls of small boats, in the preparation of artificial limbs, in the manufacture of mannikins, and various display devices and in any of a variety of laminating applications.

I claim:
1. A process for preparing shoe stiffeners consisting essentially of dipping a cotton flannel fabric into an aqueous latex containing (1) 20% to 60% by weight of resin solids comprising about 75% of polystyrene and about 25% of an 80/20 copolymer of styrene and butadiene and (2) 0.10% to 3.0% by weight of an anionic surface-active organic compound from the group consisting of alkali metal alkyl- and alkali metal alkyl aryl-sulfates, -sulfonates, -phosphates, and -phosphonates; dipping the latex impregnated flannel into an aqueous solution of aluminum sulfate, and thereafter drying the twice-dipped flannel and recovering a dry, flexible shoe stiffener, containing at least 50% by weight of said resin solids, and capable of being stiffened by the action of a solvent for said resin solids.

2. A process for preparing stiffenable sheet material, said process consisting essentially of impregnating a fibrous sheet material by contact with each of the following two liquid baths in any order of treatment: (1) an aqueous latex containing 20% to 60% by weight of resin solids consisting essentially of a mixture of polystyrene and a copolymer of styrene and butadiene in proportions such that the total amount of butadiene present in said mixture is 4%–20% by weight of said resin solids, said aqueous latex containing at least 0.10% by weight of an anionic surface-active wetting agent, and (2) an aqueous solution of a polyvalent metal salt coagulant for said aqueous latex; drying the thus impregnated sheet material and recovering a dry, flexible sheet material impregnated with coagulated resin solids in the amount of at least 50% by weight of said impregnated sheet material, said dry, flexible sheet material being stiffenable by the action of a solvent for said coagulated resin solids.

References Cited in the file of this patent

UNITED STATES PATENTS

| | | |
|---|---|---|
| 2,343,095 | Smith | Feb. 29, 1944 |
| 2,416,232 | Soday | Feb. 18, 1947 |
| 2,514,517 | Rust | July 11, 1950 |
| 2,554,899 | Cowgill | May 29, 1951 |
| 2,635,055 | Figdor | Apr. 14, 1953 |
| 2,650,163 | Horsey | Aug. 25, 1953 |